United States Patent Office 3,201,260
Patented Aug. 17, 1965

3,201,260
PROCESS FOR MAKING A COOKED DEHYDRATED FISH PRODUCT
Edward A. M. Asselbergs, Ottawa, Ontario, Canada, assignor to Canadian Patents and Development Limited, Ottawa, Ontario, Canada, a company
No Drawing. Filed May 3, 1962, Ser. No. 192,056
Claims priority, application Canada, Nov. 28, 1961, 837,000
6 Claims. (Cl. 99—209)

The present invention relates to the production of a dehydrated, cooked foodstuff comprising fish.

During recent years there has been considerable development in the manufacture of dehydrated, cooked foodstuffs which can be prepared for consumption with a minimum of time and effort. Apart from the fact that they facilitate the preparation of meals, these so-called instant products have the advantage of better shelf stability and also of occupying considerably less space than the ingredients from which they are prepared.

Little attention has so far been given to the preparation of instant fish products. Dried fish is a very old article of food but the techniques previously available for drying fish have been incapable of providing a product which could be rehydrated by addition of liquid to give a palatable form of reconstituted fish. It is an object of the present invention to provide an improved method of preparing a dried fish product.

Accordingly, the invention provides a process for the production of a dehydrated, cooked product comprising comminuting cooked fish, forming the comminuted fish into a thin layer and drying said thin layer to a low moisture content.

The invention is also concerned with products containing not only fish but also other ingredients. One type of instant food product which has found wide acceptance is instant mashed potato. An eminently satisfactory type of instant mashed potato can be produced, for example, by the process disclosed in Canadian Patent No. 620,541 of Asselbergs et al., issued May 23, 1961. Although instant mashed potato provides a very convenient source of carbohydrate it contains very little protein. By reconstituting the instant mashed potato with milk a foodstuff can indeed be obtained which contains protein derived from the milk as well as the carbohydrate afforded by the potatoes. However, milk may not be available at the time and place of reconstitution and it would be convenient if a source of protein could actually be incorporated into the instant product.

Fish protein is a cheap and excellent source of most of the amino acids required by the body. It would therefore be most desirable if an acceptable instant product could be devised containing fish as well as a carbohydrate source such as potatoes. It is a further object of the present invention to provide such a product.

Accordingly the invention provides a process for the production of a dehydrated, cooked, fish-containing product comprising mixing together comminuted, cooked fish and a cooked carbohydrate material selected from the class comprising mashed cooked potato, pre-cooked starches, pre-cooked cereals and mixtures thereof, forming a thin layer of the mixture thereby obtained and drying said thin layer to a low moisture content.

It is essential in the process of the present invention that the fish be cooked prior to comminution and the carrying out of the drying operation. Experiment has shown that unsatisfactory results are obtained when attempts are made to dry a puree of raw fish on a drum drier. Such a puree can be made by comminuting raw fillets or by the use of a proteolytic enzyme such as ficin or bromelin. However the puree does not easily pass through a screen unless the perforations are fairly large and this permits passage of pin bones. The presence of pin bones in a reconstituted product would of course be most undesirable. Furthermore, raw fish has a tendency to stick to a heated surface and this makes for very troublesome processing.

Although the invention extends to the production of a dried product made solely from fish it is a preferred feature of the invention to prepare mixtures of fish with a carbohydrate material.

The carbohydrate material which is incorporated in the mixture may be any kind of pre-cooked starch, for example potato starch or corn starch. Pre-cooked cereals such as rice, wheat or barley can also be used. However, the most satisfactory carbohydrate material to be used in the preparation of the mixtures of the present invention is mashed, cooked potato. Therefore, in the following description the invention will be described mainly with reference to the use of mashed potato rather than any other carbohydrate material.

When producing a mixture of fish and potato by the process of the present invention it is essential that the potatoes are cooked and mashed prior to the formation of the fish-potato mixture. The manner of cooking and mashing the potatoes is not critical. However, for best results a relatively short cooking period, preferably less than 15 minutes, is used as described in Canadian Patent No. 620,541. In order to ensure that cooking of the potatoes is effected in less than the prescribed preferable maximum cooking time of 15 minutes, it is necessary to cut the potatoes into pieces of relatively small cross section. Conveniently these pieces can be in the form of "French-fry" strips which generally have a cross-section of about ⅜ inch by ⅜ inch.

Advantageously the cooked pieces of potato are subjected to a "fluffing" procedure prior to being mashed. This involves causing circulation of air around the pieces of potato to disperse the moisture-laden microatmosphere surrounding each piece of potato and facilitates removal of moisture from the surface of the potato. The "fluffing" operation can conveniently be carried out by spreading the pieces of potato on a perforated screen and blowing air over them. Alternatively the pieces of potato may be tumbled in a rotating wire basket in which case the resulting agitation of the pieces of potato serves to disperse the microatmosphere mentioned above and no current of air need be supplied.

The precooking of the fish is carried out in a generally conventional manner. The fish, which may be fresh or frozen, is cleaned, enzyme treated if desired, and then cooked, preferably by immersion in boiling water for whatever length of time is necessary depending on the nature of the fish. Various other methods of cooking the fish are however feasible, for example, by infra-red heating, by dielectric methods or by more conventional methods of baking or broiling.

The ratio of the amount of fish to the amount of potato contained in the fish-potato mixture can be varied within wide limits. There is no practical upper limit to the proportion of potato that can be introduced into the mixture. However, the reduction of the fish content to a very low value will seldom be desirable because the protein content will then fall off and the product will eventually become indistinguishable from mashed potato. Theoretically, there is no upper limit to the proportion of fish in the mixture. However, with most types of fish the content of fish in the mixture should be not more than 90 percent by weight to obtain the most palatable products. If more than this amount is used there is a tendency for the product to become hard and rubbery in the subsequent drying operation and this makes it difficult to obtain a satisfactory product. Thus it is preferable according to the invention to form a fish-potato mixture which contains at least 10 percent of mashed potato. In general it is found that the best products from the standpoint of taste and nutrition and also for ready carrying out of the drying operation are those which contain from about 40 percent to about 60 percent by weight of fish, the balance being mashed potato.

The relative proportions of fish and potato just referred to represent the quantities which are compounded into the mixture that is formed into a thin layer and dried. During the drying operation there is considerably more loss of water from the mashed potato than from the fish. Hence, the ratio of dried fish to dried potato in the dehydrated product is higher than the ratio of fish to mashed potato in the undried mixture.

The reconstitution of the product can be effected by addition of an amount of water or milk or a milk-water mixture which is sufficient to yield a satisfactory consistency. If desired, the liquid employed for reconstitution may be warmed to a temperature above room temperature, for example, any temperature from room temperature up to the boiling point of the liquid being used. In some cases this is desirable to facilitate the reconstitution. The product is found to rehydrate readily and with a minimum of stirring. As a result, the reconstituted product is uniformly moist and shows little tendency to form lumps.

The embodiment of the invention which involves mixing together of the fish and the mashed potato with subsequent drying of a thin layer of the mixture thereby obtained results in the formation of a smoother and more homogeneous product than can be produced by mixing together fish and potato which have been separately cooked and dehydrated. There is a tendency for fish to become hard and rubbery when subjected to a drying operation and even when dried in a thin layer according to the present invention it tends to be rather granular. Rehydration of this granular product to give a reconstituted fish which appeals to the average palate is not easy. It is not surprising that mixing of this granular product with a cooked dehydrated mashed potato yields a mixture which, although fairly readily reconstitutable to form an edible fish-potato food, is not very palatable because of the granular nature of the fish in the mix. By admixing the comminuted fish with mashed potato prior to the drying operation no problems are encountered due to hardening of the mass while it is being dried. The presence of the potato effectively separates the fish fibers to prevent them from agglomerating into hard and rubbery granules. The product obtained is therefore smooth and homogeneous and reconstitutes readily.

As mentioned above, the fish-potato mixture is formed into a thin layer which is then dried. For best results the thickness of this layer should not be greater than fifteen thousandths of an inch. By operating with a layer of this thinness the dried product which is obtained is of small particle size and can therefore be more easily reconstituted. Thicker layers of the mixture can however be utilized, the practical upper limit of thickness being dictated by heat transfer considerations and by reconstitutability of the product. With thick layers the product has a large particle size and is less readily reconstituted.

The formation of the thin layer of fish-potato mixture can be effected by forcing the mixture through a suitable slot. For example, the mixture may be passed through the nip between two roller members consisting of rotatable heated drums. A layer of the fish-potato mixture is then formed on each of the drums and the drying of the layer is effected on the surface of the drums. Alternatively a single heated drum may be used and a layer of the fish-potato mixture built up on this single heated rotatable drum by means of one or more cold applicator rolls arranged axially parallel with the drum and carrying the fish-potato mixture on to the surface of the drum.

When the drying of the fish-potato mixture is effected by passing the mixture through the nip between two rotatable heated drums to form a layer of the mixture on each of the drums, it is desirable to operate with such a clearance between the drums that each of the layers of the fish-potato mixture is of a perforated nature. The nature of this fish-potato mixture fed to the drums is such that perforated layers are more readily formed at larger clearances than with mashed potato alone. The final product obtained has a texture similar to that of instant potato made by the process of Canadian Patent No. 620,541. Thus, the perforated layers of fish-potato mixture have an appearance resembling that of fine lacework. They can readily be broken up to yield crystal-like particles of soft and open texture. The adjective "crystal-like" is of course used with reference to the visual appearance of the particles and not their physical structure.

When employing a single heated drum and building up a layer of fish-potato mixture on the drum by means of cold applicator rolls the thickness of the layer of mixture on the heated drum is determined not so much by the separation between the drum and the applicator rolls but by the relative degree of adherence of the mixture to the drum and the rolls respectively. Using an arrangement of this type it is possible to form layers of the fish-potato mixture which are either perforated or imperforate. The perforated layers yield a crystal-like product comparable with that described above. The imperforate layers yield a more solid, flaky product which is entirely satisfactory except that it does not rehydrate quite so easily. Whereas the crystal-like product will rehydrate with cold milk or water a hot liquid has to be used to achieve satisfactory reconstitution of the flaky product.

As mentioned above, it is preferred that the thickness of the layers is not greater than fifteen thousandths of an inch. Perforated layers of the mixture are not of uniform thickness so that the thickness of such layers can be conveniently indicated only by reference to their maximum thickness. When perforated layers of the mixture are formed by passing the mixture between two rotatable heated drums the maximum thickness of each layer will be equal to the separation between the faces of the drums. It may also be noted that some shrinkage takes place during the drying operation so that the layer of dried product will be thinner than the layer before drying.

The following examples are given by way of illustration and without limitation.

*Example 1*

Freshly dug potatoes of the Sebago variety grown in New Brunswick, were peeled in an abrasion peeler, and trimmed to remove defects such as eyes and spots. They were then sliced into "French-fry" portions consisting of strips of potato having a cross-section of 0.375 inch by 0.375 inch. Cooking of the potatoes was then carried out in boiling water at 212° F. in a steam jacketed kettle of stainless steel with a weight ratio of water to potatoes of about 1 to 1. The cooking time was 6.5 minutes.

After draining off the water the potato strips were spread out on a perforated screen and air at room temperature blown over them. This had the effect of forcibly removing the moisture-saturated air surrounding the potato strips thereby effecting surface drying and "fluffing" of the potato strips to give a mealy appearance.

The potatoes were then fed to a conventional mashing machine, commonly called a ricer, comprising a hopper into which the potatoes were dropped and a conical screw conveyor which served to withdraw the potatoes from the base of the hopper and force them through the perforations in a perforated conical screen closely surrounding the screw conveyor.

In the formation of a commercial product suitable additives, well known in the art, could be introduced at this point for ensuring a desired texture, flavour, colour, stability and odour of the final product.

The mashed potato falling through the perforated conical screen of the mashing machine was then mixed in batches with a quantity of comminuted, cooked fish, 10 lbs. of the mashed potatoes being mixed with 25 lbs. of cooked, comminuted fish in a slow speed food mixer. The cooked, comminuted, fish had been prepared by boiling frozen or fresh fillets of hake in water for 4–6 minutes. Vinegar, salt, pepper and nut-meg were added to the cooking water. After the fish was cooked the water was drained off and the cooked fish was comminuted using a standard type of comminuter with a fine screen (perforations of 1/32"). The use of a fine screen is important as it ensures that any bones passing through the screen are finely comminuted.

The mixture of cooked, comminuted fish and mashed potatoes, containing about 71% of fish, was fed to a double drum drier, the rotating drums of which had a length of 7.75 inches and a diameter of 6 inches. Steam under 30 lbs. pressure was supplied to the interior of each of the drums. The clearance between the drums was varied between about .001 and about .015 inch, four runs being carried out with clearances of .002, .006, .010 and .014 inch respectively. The drums rotated at a speed of about 2 revolutions per minute.

In each run a continuous but perforated layer of fish-potato mix was formed on the surface of each drum. In appearance the layer resembled a lace work or felted fibrous structure having a random orientation of the fibers. Knife scraper devices were used for removing the layers from the drums, each of the layers having been in contact with the associated drum for a period of about 8, 12, 16 and 20 seconds respectively, depending on the drum clearance, prior to its removal from the drum at which time the product contained about 8% moisture.

The layers of dried product thereby obtained were readily disintegrated by slight mechanical force into a mass of crystal-like particles resembling snow crystals. The moisture content could be reduced below the above-mentioned value of 8% by operating in an environment the humidity of which was more carefully controlled than that used for the present experiments. For commercial purposes moisture contents of less than 5%, preferably from 0 to 3%, are desirable. In any event the products of the invention are to be dried to a moisture content of less than 15%.

The product of each run could be reconstituted by admixture with a suitable amount of milk, or a milk-water mixture, and eggs. The amount of fluid used in the reconstitution can be varied in accordance with taste and with the purpose for which the product is to be used. The texture and flavour of the reconstituted product were found to be excellent.

*Example 2*

The procedure of Example 1 was repeated but using cod instead of hake and using a fish-potato mix containing about 59% of fish.

Each of the four runs gave a product which was very palatable and could be readily reconstituted.

*Example 3*

The procedure of Example 1 was repeated but using pollock instead of hake and using a fish-potato mix containing about 50% of fish.

Each of the four runs gave a product which was very palatable and could be readily reconstituted.

*Example 4*

The procedure of Example 1 was repeated but using whitefish instead of hake and using a fish-potato mix containing about 41% of fish.

Each of the four runs gave a product which was very palatable and could be readily reconstituted.

*Example 5*

The procedure of Example 1 was repeated except that no mashed potato was included in the mix, i.e., the cooked comminuted fish was fed alone to the double drum drier, using a drum clearance of .007 inch.

A continuous but perforated layer of fish formed on each drum and, like the layers of the mixtures of the previous examples, it resembled a lace work or felted fibrous structure. The layers remained in contact with the drums for about 13 seconds which reduced the moisture content to about 6%. The dried layers readily disintegrated to give a mass of crystal-like particles resembling snow crystals.

These particles could be reconstituted with water or a water-milk mixture to form a product which was edible, albeit rather hard and granular. However, the reconstitution was not as readily effected as with the fish-potato mixes of the previous examples. By mixing the product with dehydrated cooked potato obtained by the process of Canadian Patent No. 620,541, on a 1:1 dry weight basis, a fish-potato mixture could be produced which rehydrated more satisfactorily. The product obtained by reconstitution of this mixture was still harder to chew and less palatable than the reconstituted products of the previous examples because of the hard and granular nature of the fish content.

*Example 6*

The procedure of Example 1 was repeated except that each batch of mixture fed to the double drum drier consisted of 10 lbs. of comminuted, cooked hake, 3 lbs. of mashed potato and 8 oz. of pre-cooked potato starch.

Each of the four runs gave a product which was very palatable and could readily be reconstituted.

*Example 7*

The procedure of Example 1 was repeated except that each batch of mixture fed to the double drum drier consisted of 10 lbs. of comminuted, cooked hake and 1 lb. of pre-cooked potato starch. No mashed potato was included in the mix.

Each of the four runs gave a product which was readily reconstituted. The reconstituted material was edible although less palatable than reconstituted materials obtained from products formed by drying mixtures containing mashed, cooked potato.

It will be observed that the types of fish used in the foregoing examples are all of relatively low oil content. This is desirable for the production of a dried product having good stability. With oily fish such as mackerel or herring the product has to be more carefully stored if the development of rancidity is to be avoided. Removal of oil from such fish, for example, by solvent extraction, could be resorted to prior to cooking for the purpose of improving the stability of the final product but this would be an expensive operation.

It will be appreciated that in producing a mixture of fish and a carbohydrate material the latter component of the mixture may be a mixture of any of the various carbohydrate materials mentioned as being suitable for use in the method of the invention. For example it is possible to use a mixture of mashed, cooked potato and pre-cooked potato starch as specifically illustrated in Example 6 above. Other feasible mixtures would be a mix of mashed cooked potato with pre-cooked rice and a mix of pre-cooked potato starch with pre-cooked rice. Just as cooked, mashed potato is the preferred carbohydrate material, the preferred mixes of carbohydrate material are those which contain a major proportion of cooked mashed potato. However, the presence of a minor proportion of a pre-cooked starch is in many cases desirable since it enhances the reconstitutability and workability of the product.

It has been explained above that the products of the invention may be produced from a perforated or an unperforated layer. In the former case the product has a crystal-like appearance and texture and a very open structure. This type of product is preferred to the flakes which are obtained by operating with an unperforated layer. It is more wettable and rehydrates more readily than the flakes; it is therefore possible to effect reconstitution with a liquid at room temperature, e.g., 70° F., whereas the flaky product requires warmer liquid for good reconstitution. This is important in applications of the product where the foodstuff is prepared for storage under refrigeration to be warmed up for consumption at a future time. An example of such an application is the preparation of pre-cooked frozen dinners. The crystal-like instant product of the invention can be reconstituted in the cold and then frozen to be reheated when the meal has to be served. The foodstuff is heated only once in this procedure. By contrast, when using the flaky product reconstitution has to be effected with warm liquid; the warm reconstituted product is then frozen to be reheated at a later time. In this procedure the foodstuff is heated twice. Apart from the waste of heat this entails the palatability of the product is impaired by the double heating.

In the above description it has been emphasized that the fish must be cooked prior to the comminuting operation. Similarly the carbohydrate materials are to be cooked or pre-cooked. It will be understood that the drying operation is capable of effecting a final stage of cooking. Accordingly the terms "cooked" and "pre-cooked" should be interpreted to mean that at least partial cooking of the material has been effected. The possibility that further cooking takes place at a later stage is not excluded.

The term "fish" is broadly used in this specification and in the appended claims to cover all normally edible aquatic species including shellfish, such as lobster, shrimp and crab, and including mammals such as whales and dolphins.

I claim:

1. A process for the production of a dehydrated, cooked and readily reconstitutable fish-containing product comprising mixing together comminuted, cooked fish and a cooked carbohydrate material selected from the class consisting of mashed cooked potato, pre-cooked starches, pre-cooked cereals and mixtures thereof, forming a layer of the mixture thereby obtained, said layer having a thickness not greater than about fifteen thousandths of an inch and drying said layer to a moisture content of less than about fifteen percent by weight of the product.

2. A process of the production of a dehydrated, cooked, and readily reconstitutable fish-containing product comprising mixing together cooked fish and mashed cooked potato, forming a layer of the mixture thereby obtained, said layer having a thickness not greater than about fifteen thousandths of an inch and drying said layer on the surface of a heated rotating drum to a moisture content of less than about fifteen percent by weight of the product.

3. A process as claimed in claim 2 wherein said layer is perforated and the drying on said surface is controlled to provide a product in the form of crystal-like particles.

4. The process of claim 1 wherein said fish is cooked by immersion in hot water for a suitable time.

5. The process of claim 1 wherein said layer is formed by passing said mixture through the nip between a pair of roller members.

6. The process of claim 1 wherein two layers of the mixture are formed by passing said mixure through the nip between the pair of heated, rotatable drums, the clearance between the drum being from about 0.001 to about 0.015 inch, and the drying of said layers is effected upon the surfaces of said drums.

References Cited by the Examiner

UNITED STATES PATENTS 1,027,128  5/12  Hatmaker _____ 99—208
1,047,760  12/12  Davidson _____ 99—209 XR A. LOUIS MONACELL, *Primary Examiner.*

ABRAHAM H. WINKELSTEIN, *Examiner.*